(12) United States Patent
Kruspe et al.

(10) Patent No.: US 6,727,696 B2
(45) Date of Patent: *Apr. 27, 2004

(54) DOWNHOLE NMR PROCESSING

(75) Inventors: Thomas Kruspe, Wienhausen (DE); Christian Kiesl, Hannover (DE); Holger Thern, Hannover (DE); Hartmut Schrader, Nienhagen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/928,768

(22) Filed: Aug. 13, 2001

(65) Prior Publication Data

US 2002/0153888 A1 Oct. 24, 2002

Related U.S. Application Data

(63) Continuation-in-part of application No. 09/839,423, filed on Apr. 20, 2001, now Pat. No. 6,446,736, which is a continuation of application No. 09/247,340, filed on Feb. 9, 2001, now Pat. No. 6,247,542.
(60) Provisional application No. 60/077,144, filed on Mar. 6, 1998.

(51) Int. Cl.$^7$ ................................................. G01V 3/00
(52) U.S. Cl. ...................................................... 324/303
(58) Field of Search ........................................... 324/303

(56) References Cited

U.S. PATENT DOCUMENTS

| | | | | |
|---|---|---|---|---|
| 4,646,018 A | * | 2/1987 | Brown | 324/303 |
| 5,023,551 A | | 6/1991 | Kleinberg et al. | 324/303 |
| 5,381,092 A | * | 1/1995 | Freedman | 324/303 |
| 5,486,762 A | | 1/1996 | Freedman et al. | 324/303 |
| 5,585,720 A | | 12/1996 | Edwards | 324/309 |
| 5,596,191 A | * | 1/1997 | Mickael | 250/269.4 |
| 5,629,623 A | * | 5/1997 | Sezginer et al. | 324/303 |
| 5,680,043 A | * | 10/1997 | Hurlimann et al. | 324/303 |
| 5,696,448 A | * | 12/1997 | Coates et al. | 324/303 |

(List continued on next page.)

FOREIGN PATENT DOCUMENTS

| | | |
|---|---|---|
| EP | 0726458 A2 | 8/1996 |
| WO | WO01/13142 | 2/2001 |

OTHER PUBLICATIONS

Frederick Hayes–Roth; *The Knowledge–Based Expert System: A Tutorial*, IEEE Computer 17(9): 11–28, 1984.
PC AI—Expert Systems, http://www.pcai.com/web/ai infor/expert systems.html pp. 1–15.
What is SNNS? Download from SNNS website.

*Primary Examiner*—Diego Gutierrez
*Assistant Examiner*—Dixomara Vargas
(74) *Attorney, Agent, or Firm*—Madan, Mossman & Sriram, P.C.

(57) ABSTRACT

An expert system is included in a downhole processor designed to acquire and process NMR data downhole in real time. The downhole processor controls the acquisition of the NMR data based at least in part on instructions transmitted downhole from a surface location and at least in part on evaluation of downhole conditions by the expert system. The downhole conditions include drilling operation conditions (including motion sensors) as well as lithology and fluid content of the formation obtained from other MWD data. The wait time, number of echos, number of repetitions of an echo sequence, interecho time, bandwidth and shape of the tipping and refocusing pulses may be dynamically changed. Data processing is a combination of standard evaluation techniques. Selected data and diagnostics are transmitted uphole. The expert system may be implemented as a two stage neural net. The first stage does the formation evaluation and the second stage controls the NMR pulse sequence.

98 Claims, 4 Drawing Sheets

U.S. PATENT DOCUMENTS

| | | | |
|---|---|---|---|
| 5,705,927 A | | 1/1998 | Sezginer et al. ............. 324/303 |
| 5,796,252 A | * | 8/1998 | Kleinberg et al. ........... 324/303 |
| 5,842,149 A | * | 11/1998 | Harrell et al. ................... 702/9 |
| 5,914,598 A | * | 6/1999 | Sezginer et al. ............. 324/300 |
| 5,936,405 A | | 8/1999 | Prammer et al. ............ 324/303 |
| 5,977,768 A | * | 11/1999 | Sezginer et al. ............. 324/300 |
| 6,021,377 A | * | 2/2000 | Dubinsky et al. ............... 702/9 |
| 6,023,163 A | | 2/2000 | Flaum et al. ................. 324/303 |
| 6,041,860 A | * | 3/2000 | Nazzal et al. ........... 166/250.01 |
| 6,069,477 A | | 5/2000 | Chen et al. .................. 324/303 |
| 6,094,048 A | | 7/2000 | Vinegar et al. .............. 324/303 |
| 6,107,796 A | * | 8/2000 | Prammer .................... 324/303 |
| 6,114,851 A | * | 9/2000 | Kruspe et al. ............... 324/303 |
| 6,163,153 A | | 12/2000 | Reiderman et al. ......... 324/314 |
| 6,215,301 B1 | | 4/2001 | Lenssen ....................... 324/303 |
| 6,218,833 B1 | * | 4/2001 | Kruspe et al. ............... 324/303 |
| 6,225,803 B1 | * | 5/2001 | Chen ........................... 324/300 |
| 6,247,542 B1 | | 6/2001 | Kruspe et al. ................. 175/40 |
| 6,255,817 B1 | * | 7/2001 | Poitzsch et al. ............. 324/300 |
| 6,291,995 B1 | | 9/2001 | Speier et al. ................ 324/303 |
| 6,326,784 B1 | | 12/2001 | Ganesan et al. ............. 324/303 |
| 6,326,785 B1 | * | 12/2001 | Kruspe ........................ 324/300 |
| 6,331,775 B1 | | 12/2001 | Thern et al. ................. 324/303 |
| 6,366,089 B1 | | 4/2002 | Poitzsch et al. ............. 324/303 |
| 6,373,248 B1 | | 4/2002 | Poitzsch et al. ............. 324/303 |
| 6,411,087 B1 | * | 6/2002 | Fan et al. .................... 324/300 |
| 6,429,653 B1 | * | 8/2002 | Kruspe et al. ............... 324/300 |
| 6,446,736 B1 | * | 9/2002 | Kruspe et al. ................. 166/66 |

\* cited by examiner

DOWNHOLE NMR PROCESSING

CROSS REFERENCES TO RELATED APPLICATIONS

This application is a Continuation in part of U.S. patent application Ser. No. 09/839,423 filed on Apr. 20, 2001, now U.S. Pat. No. 6,446,736, which is a continuation of U.S. patent application Ser. No. 09/247,340 filed Feb. 09, 1999, now U.S. Pat. No. 6,247,542 which claims the benefit of Provisional application No. 60/077,144 filed Mar. 6, 1998.

BACKGROUND OF THE INVENTION

1. Field of the Invention

This invention is related to methods for acquiring and processing nuclear magnetic resonance (NMR) measurements for determination of longitudinal and transverse relaxation times $T_1$ and $T_2$. Specifically, the invention deals with use of an expert system downhole for acquiring and evaluating NMR measurements contemporaneous with the drilling of wells and with use of a downlink communication from the surface for modifying the parameters of the downhole acquisition system.

2. Description of the Related Art

Nuclear magnetic resonance is used in the oil industry, among others, and particularly in certain oil well logging tools. NMR instruments may be used for determining, among other things, the fractional volume of pore space and the fractional volume of mobile fluid filling the pore space of earth formations. Methods of using NMR measurements for determining the fractional volume of pore space and the fractional volume of mobile fluids are described, for example, in "Spin Echo Magnetic Resonance Logging: Porosity and Free Fluid Index Determination," M. N. Miller et al., Society of Petroleum Engineers paper no. 20561, Richardson, Tex., 1990. Further description is provided in U.S. Pat. No. 5,585,720, of Carl M. Edwards, issued Dec. 17, 1996 and having the sane assignee as the present application, entitled "Signal Processing Method For Multi-exponentially Decaying Signals And Applications To Nuclear Magnetic Resonance Well Logging Tools." The disclosure of that patent is incorporated herein by reference.

Deriving accurate transverse relaxation time $T_2$ relaxation spectra from nuclear magnetic resonance (NMR) data from logging subterranean formations, or from cores from such formations, is critical to determining total and effective porosities, irreducible water saturations, and permeabilities of the formations. U.S. Pat. No. 6,069,477 to Chen et al having the same assignee as the present application discusses the constituents of a fluid saturated rock and various porosities of interest. Referring to FIG. 1, the solid portion of the rock is made up of two components, the rock matrix and dry clay. The total porosity as measured by a density logging tool is the difference between the total volume and the solid portion. The total porosity includes clay-bound water, capillary bound water, movable water and hydrocarbons. The effective porosity, a quantity of interest to production engineers is the sum of the last three components and does not include the clay bound water. Accurate spectra are also essential to estimate $T_2$ cutoff values and to obtain coefficients for the film model or Spectral Bulk Volume Irreducible (SBVI) model. Effective porosities are typically summations of partial porosities; however, distortion of partial porosity distributions has been commonly observed for a variety of reasons. These reasons include poor signal-to-noise ratio (SNR), and poor resolution in the time domain of the NMR data.

The most common NMR log acquisition and core measurement method employs $T_2$ measurements using CPMG (Carr, Purcell, Meiboom and Gill) sequence, as taught by Meiboom and Gill in "Modified Spin-Echo Method for Measuring Nuclear Relaxation Time," Rev. Sci. Instrum. 1958, 29, pp. 688–691. In this method, the echo data in any given echo train are collected at a fixed time interval, the interecho time (TE). Usually, a few hundred to a few thousand echoes are acquired to sample relaxation decay. However, for determination of CBW, echo sequences of as few as ten have been used.

There are numerous examples of wireline NMR logging tools used for obtaining information about earth formations and fluids after a wellbore has been drilled. The logging tools are lowered into the borehole and NMR signals are obtained using different configurations of magnets, transmitter coils and receiver coils. Rig time is expensive, so that the general objective in wireline logging is to obtain interpretable data within as short a time as possible. Depending upon the reservoir, different radio frequency (RF) pulsing schemes for generating RF fields in the formation have been used. The most commonly used pulsing schemes are variations of the CPMG sequence. The parameters that may be varied are the wait time, the number of pulses within a CPMG sequence, and the time interval between the pulses. Long wait times are needed for proper evaluation of the long relaxation times of gas reservoirs while short wait times and/or short pulse spacings are used for evaluating clay bound water (CBW). For example, co-pending U.S. patent application Ser. No. 09/396,286 (now U.S. Pat. No. 6,331,775) of Thern et al, having the same assignee as the present application and the contents of which are fully incorporated herein by reference, discusses the use of a dual wait time acquisition for determination of gas saturation in a formation. U.S. Pat. No. 5,023,551 to Kleinberg et al discusses the use of CPMG sequences in well logging. U.S. Pat. No. 6,069,477 to Chen et al, the contents of which are fully incorporated herein by reference, teaches the use of pulse sequences with different pulse spacings to determine CBW. Phase alternated pairs (PAPs) of sequences are commonly acquired to reduce the effects of ringing.

Tool vibration is usually not a problem in wireline logging, so that data may be acquired using continuous pulsing while the logging tool is being pulled up the borehole. In many instances, other logs may already have been run before the NMR measurements are made, so that some preliminary evaluation of the subsurface formations may already exist. This makes it possible to use predefined pulse sequences optimized for specific evaluation objectives.

The commonly used seven conductor wireline is not a serious limitation to two-way communication from the surface to the logging tool. This makes it possible to process data uphole with little or no downhole processing and to send instructions downhole to the logging tool to modify the acquisition schemes based on the surface processing.

In contrast, measurements made with a drilling assembly in the wellbore have several problems. First of all, there is little prior information available about the actual subsurface formations except that inferred from surface seismic data. As would be known to those versed in the art, the resolution of such seismic data is of the order of several meters to tens of meters. This makes it difficult, if not impossible, to base an acquisition scheme on the basis of expected properties of formations.

Secondly, when the drilling assembly is in a borehole, data communication capability is in most cases severely limited. Telemetry is accomplished either by sending acoustic pulses through the mud or through the drillstring. The data rate with mud pulsing is limited to a few bits per second and communication through the drillstring becomes a serious problem when the drillbit is being operated due to the vibration and noise produced. This makes it impossible to evaluate acquired data at the surface and to modify the acquisition scheme based on this evaluation.

A third problem arises from the nature of NMR data itself. The sensitive volume of commonly used logging tools is no more than a few millimeters in thickness. The RF frequency is tuned to operate at the Larmor frequency corresponding to the static magnetic field in the sensitive volume, so that any transversal motion of the tool during drilling will mean that the RF pulses have a frequency corresponding to a region that has not been pre-polarized by the static magnetic field. This results in a severe degradation of the data. U.S. Pat. No. 5,705,927 issued to Kleinberg discloses making the length of each CPMG sequence small, e.g. 10 ms, so that the drill collar cannot be displaced by a significant fraction of the vertical or radial extent of the sensitive region during a CPMG pulse sequence. However using such short sequences and short wait times only gives an indication of the bound fluid volume and gives no indication of the total fluid volume.

There is a need for an apparatus and method of obtaining NMR measurements while a wellbore is being drilled that is able to modify the acquisition parameters with a minimum of communication with the surface. Such an invention should preferably be able to adjust the acquisition depending upon actual downhole conditions. The method should preferably be robust in the presence of vibration of the logging tool. The present method satisfies this need.

SUMMARY OF THE INVENTION

The present invention is an apparatus and method for acquiring NMR data of an earth formation using a sensor assembly conveyed on a measurement while drilling device in a borehole in the earth formation. The sensor assembly includes components on a non-rotating sleeve that may be clamped to the formation. With this arrangement, it is possible to continue drilling operations ("making hole") while making NMR pulse echo measurements at a fixed depth in the borehole and substantially isolated from vibrations caused by drilling. A downhole processor controls the acquisition and processing of the data. The processor controls the acquisition parameters based upon downhole motion sensors and also based upon control signals sent from the surface. Motion sensors such as accelerometers are used to monitor the motion of the sensor assembly and Quality control diagnostics are generated in real time. The processing includes standard processing methods. The basic pulse sequence is a CPMG sequence, although modified CPMG sequences with reduced power consumption may be employed.

An expert system in the downhole processor also determines the lithology and fluid content of formations being drilled based on signals from other formation evaluation sensors such as gamma ray, neutron, resistivity and acoustic sensors. Information from a formation pressure tester (FPT) may also be used. The FPT provides measurements of formation pressure, mobility and compressibility of the fluid. Based upon this evaluation of the formation lithology and fluid content, the expert system may control the NMR acquisition parameters independently of surface control.

Under the control of the downhole processor, measurements may be made in one of several modes. These include measurements while the NMR sensor assembly is clamped, measurements made when the NMR sensor assembly is rotating, measurements made when connecting (adding or removing drill segments at the surface) and measurements made while tripping (pulling the drillstring out of the borehole).

The parameters of the pulse sequence that may be controlled include the wait time, the number of echos in a phase alternated pulse sequence, the number of repetitions of the phase alternated sequence, the tipping angle of the refocusing pulses, and the interecho spacing. Motion triggered pulsing may be used. In addition, the shape and bandwidth of the refocusing pulses may also be changed dynamically.

DETAILED DESCRIPTION OF THE INVENTION

Figure 1:
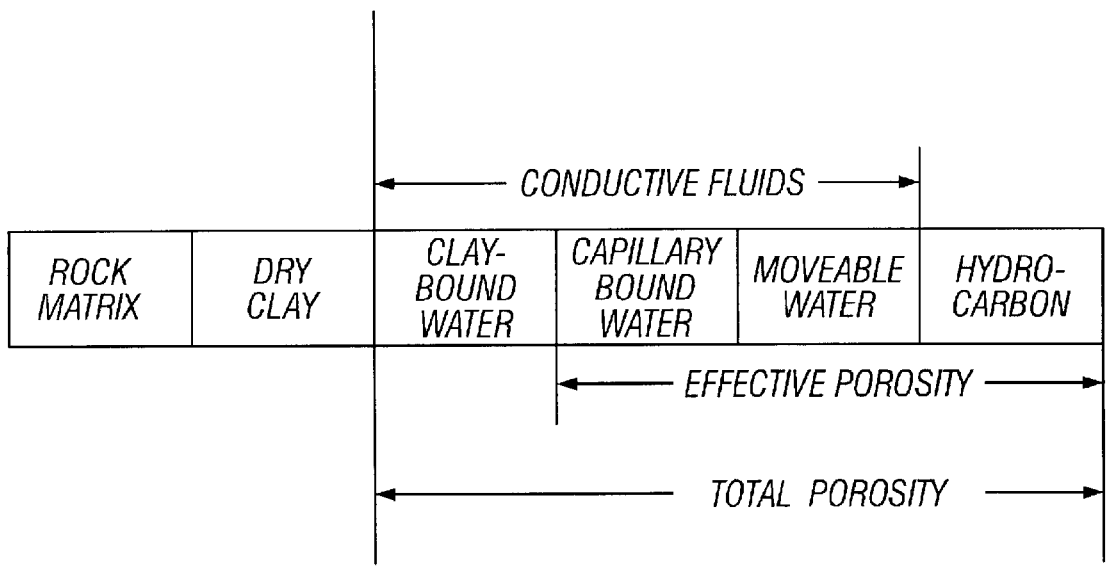
FIG. 1 shows the different constituents of a fluid filled rock.
Figure 2:
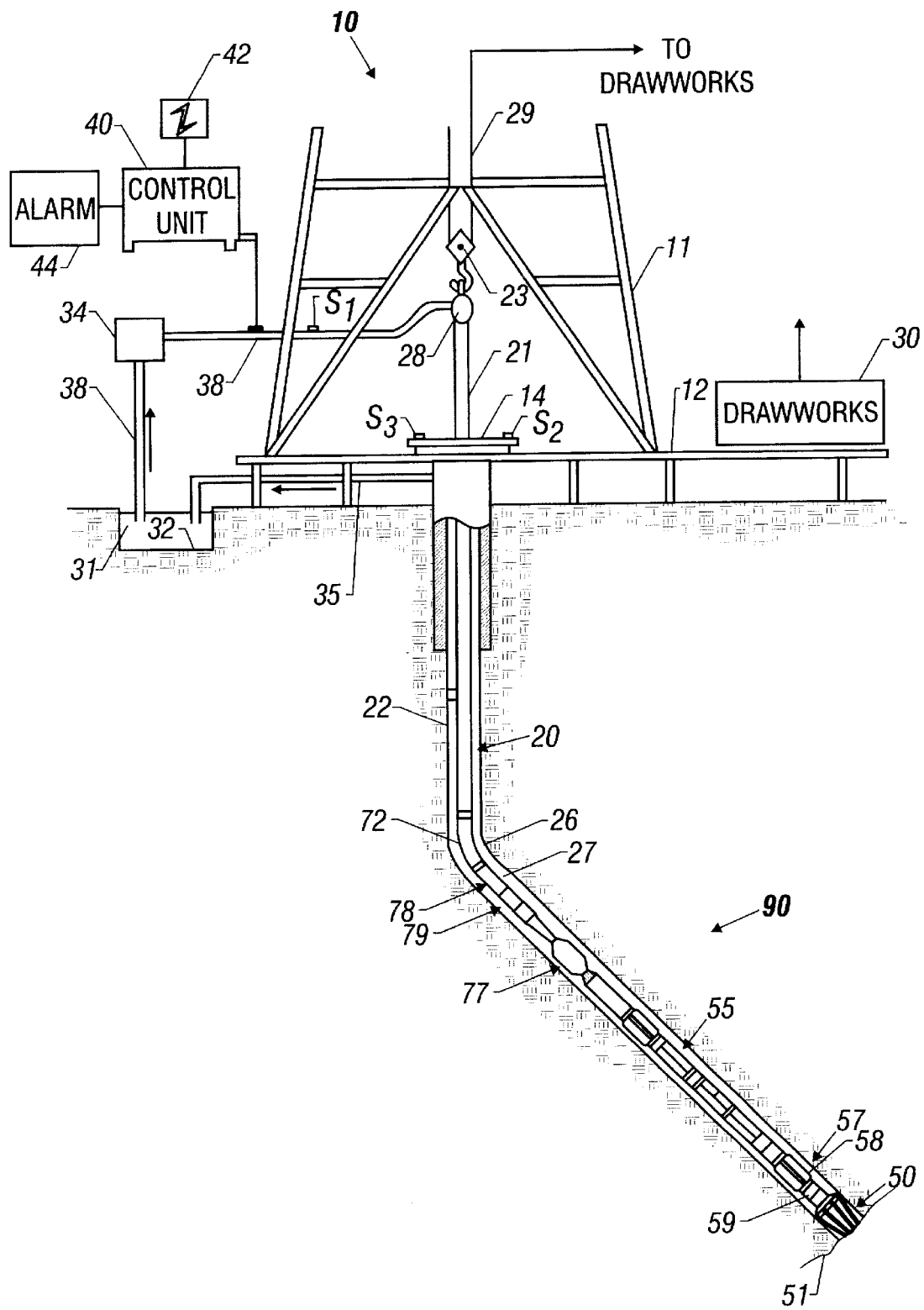
FIG. 2 shows the arrangement of a measurement-while-drilling system in accordance with the present invention.

FIG. 2 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drilstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 2, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

A suitable NMR device for use in the present invention is disclosed in U.S. Pat. No. 6,247,542 to Kruspe et al, the contents of which are fully incorporated herein by reference. This is show in FIG. 3. A segment 70 of drill pipe 22, illustrated in greater illustrates the apparatus and method according to Kruspe including a sleeve member, such as a sensor assembly, slidably coupled to a longitudinal member, such as a section of drill pipe, wherein, when the sleeve member is non-rotating, the longitudinal member is free to rotate. The sleeve member may be held in a non-rotating position through engagement with the borehole wall and a decoupling of the sleeve member and the rotating drillstring. However, the apparatus and method according to the present invention can be adapted for any MWD device or tool typically used on a rotating drillstring.

Figure 3:
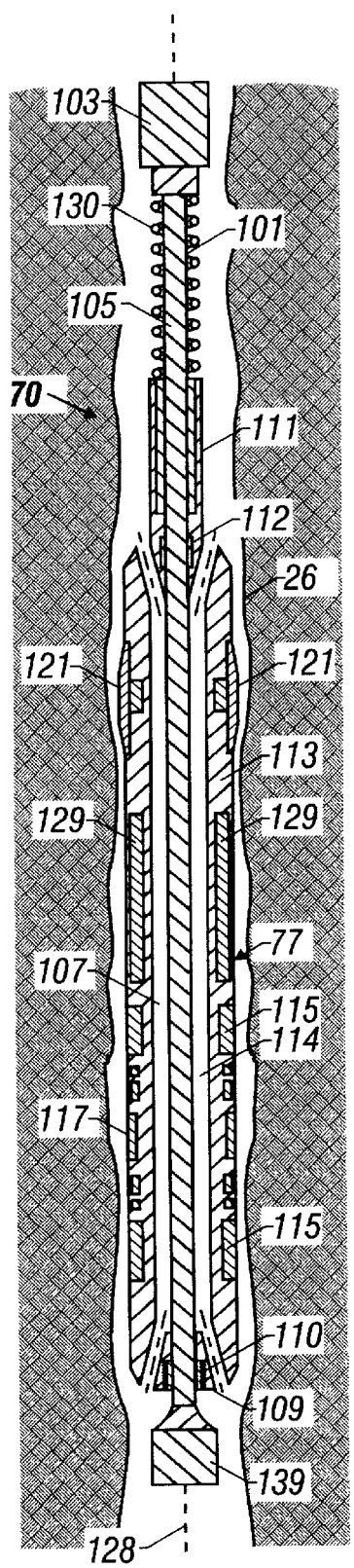
FIG. 3 shows a cross section of a drilling assembly including a sensor assembly in accordance with the present invention.

The MWD tool 79, including an associated pulsed NMR tool 77 having a sensor assembly 113, and the pulsed power unit 78 are connected in tandem in the drilling assembly 90. The MWD tool 79 may also include a sonic sensor, a density measurement tool, and a porosity measurement tool. As seen in FIG. 3, the NMR tool 77 is rotationally symmetric about a longitudinal axis 128 of the drilling assembly 90. The longitudinal member is, for example, a drill pipe section 101, which forms the core of the segment 70. Alternatively, the longitudinal member is a shaft in a downhole directional drilling assembly. The drill pipe section 101 is connected to the drillstring 20 by the upper tool joint 103 and the lower tool joint 139, and has a channel or flow pass 105 for the drilling mud to flow downhole. The sensor assembly 113 surrounds the drill pipe section 101 and is slidably coupled to the longitudinal member or the drill pipe section 101. The sensor assembly 113 is coupled to the drill pipe section 101 by at least one of guide sleeves 109 and 111. The guide sleeves 109 and 111 include, for instance, slip rings and bearings 110 and 112, respectively. Alternatively, a single guide sleeve (not shown) including slip rings and bearings, is used, for example, centrally located between ends of the sensor assembly 113. The guide sleeves 109 and 111 allow the sensor assembly 113 to move freely in the axial direction and to a lesser extent laterally with respect to the drill pipe section 101. The sensor assembly 113 has an outer diameter that is somewhat less than the inner diameter of the borehole 26. For illustrative purposes, FIG. 3 shows the space between the sensor assembly 113 and the borehole wall in an exaggerated manner. The NMR sensor assembly includes flow paths 107 and 114 for return flow of the drilling mud from the drilling assembly 90 below wherein the gap between the sensor assembly 113 and the borehole wall are minimized.

The magnet assembly 115, for providing the static magnetic field, and the RF coil assembly 117 are disposed in the sensor assembly 113. The RF coil assembly 117 includes, for instance, at least one transmitter for transmitting a pulsed RF field into the formation. In the configuration as illustrated in FIG. 3, the RF field is axial and is orthogonal to the static field of the permanent magnet assembly 115 in a region of interest or examination outside the borehole for NMR signal measurements. However, the apparatus of the present invention is not limited to the illustrated sensor assembly 113. Any number of appropriate magnet arrangements and antenna or coil arrangements which provide a static magnetic field and an RF field orthogonal to the static magnetic field direction for creating the region of interest for NMR signal sensitivity can be used according to the present invention. For example, the NMR tool 77 can employ separate transmitter and receiver RF coils, located, for example, on the sensor assembly 113.

Typically, the RF coil assembly 117 is pulsed and creates a high frequency electromagnetic RF field orthogonal to the static magnetic field generated by the magnet assembly 115 and in the region of substantially uniform field strength creating the region or volume of interest for NMR signal sensitivity. The sensor assembly 113 detects the NMR signals resulting therefrom. Rock pores in the earth formations surrounding the wellbore are filled with fluid, typically water or hydrocarbon. The hydrogen nuclei in the fluid are aligned by the region of homogeneous magnetic field, generated by the magnet assembly 115. The hydrogen nuclei are then flipped away from the homogeneous magnetic field by the pulsed RF field produced by RF coil assembly 117. At the termination of the pulsed RF field from RF coil assembly 117, the hydrogen nuclei revolve or precess at high frequency around the homogeneous magnetic field inducing an NMR signal in the RF coil assembly 117 until the hydrogen nuclei relax to the original direction along the homogeneous magnetic field. The induced NMR signals are processed downhole or sent to the surface for processing.

Those versed in the art would recognize that, depending upon the configuration of the permanent magnet assembly 115, the region of examination could have one of a number of configurations. In one embodiment, the region of examination could be substantially toroidal shaped with the axis of the toroid along the longitudinal axis of the tool. In other configurations, the region of examination could be localized on opposite sides of the borehole or even on just one side of the borehole. It will also be clearly apparent to those skilled in the art that the static magnetic field area can also be obtained if the magnet assembly 115 includes dc-energized electromagnets, or superconducting dc electromagnets. All of these are intended to be within the scope of the present invention.

The NMR electronics 129 is housed in the NMR sensor assembly 113. The purpose of the NMR electronics 129 is to control the sensor assembly 113, record, process and transmit the recorded data, to the telemetry module 72. This can be done by means of electrical or acoustic telemetry by known devices and will not be discussed. A spring 130 having a cable conduit through the spring 130 allows power and data transmission via the guide sleeve 111 and slip ring through the cable conduit to and from the MWD tool 79. The MWD tool 79 also transmits data to the sensor assembly 113, for example, through mud pulse telemetry, and provides power from the power unit 78. The NMR electronics may also be referred to hereafter as a downhole processor, though it is to be understood that a downhole processor may be located at other positions in the downhole assembly.

The sensor assembly 113 is also provided with at least one clamping pad, clamping piston or ribs 121. The ribs 121 are capable of outward movement for locking the sensor assembly 113 to the borehole wall during measurement by the sensor assembly 113. In one embodiment, the ribs 121 are hydraulically activated. In the inactivated position of the ribs 121, the sensor assembly 113 rests on the lower tool joint 139 and is held up against gravitational pull by the spring 130 that is fixedly attached to the drill pipe section 101. Continued rotation of the drillstring 20 loosely carries the sensor assembly 113 along. In the activated position, the ribs 121 engage the borehole walls and prevent any further movement of the sensor assembly 113. Further rotation of the drillstring 20 does not affect the position of the sensor assembly 113 that remains in a clamped position against the borehole wall. In the clamped position, the sensor assembly 113 is essentially decoupled from rotational and vertical movement of the drillstring 20, enabling measurements, such as NMR measurements from the NMR sensor assembly 113, to be carried out without interference from tool motion and vibration. Due to the proximity of the borehole wall to the magnet assembly 115, the region of examination is within the formation and any signal from the borehole fluid is small. In typical operation, the NMR measurement takes between 0.01 to 1 second, during which time the drill pipe section 101 advances some distance. Once the NMR measurement has been completed, the ribs 121 are retracted, as a result of which the sensor assembly 113 is no longer coupled to the borehole wall. The sensor assembly 113 then drops down until any further downward motion is stopped by the spring 130. In another embodiment, the ribs 121 are actuated electrically, e.g., by a stepper motor. Other methods, such as those using springs, would be known to those versed in the art.

Figure 4:
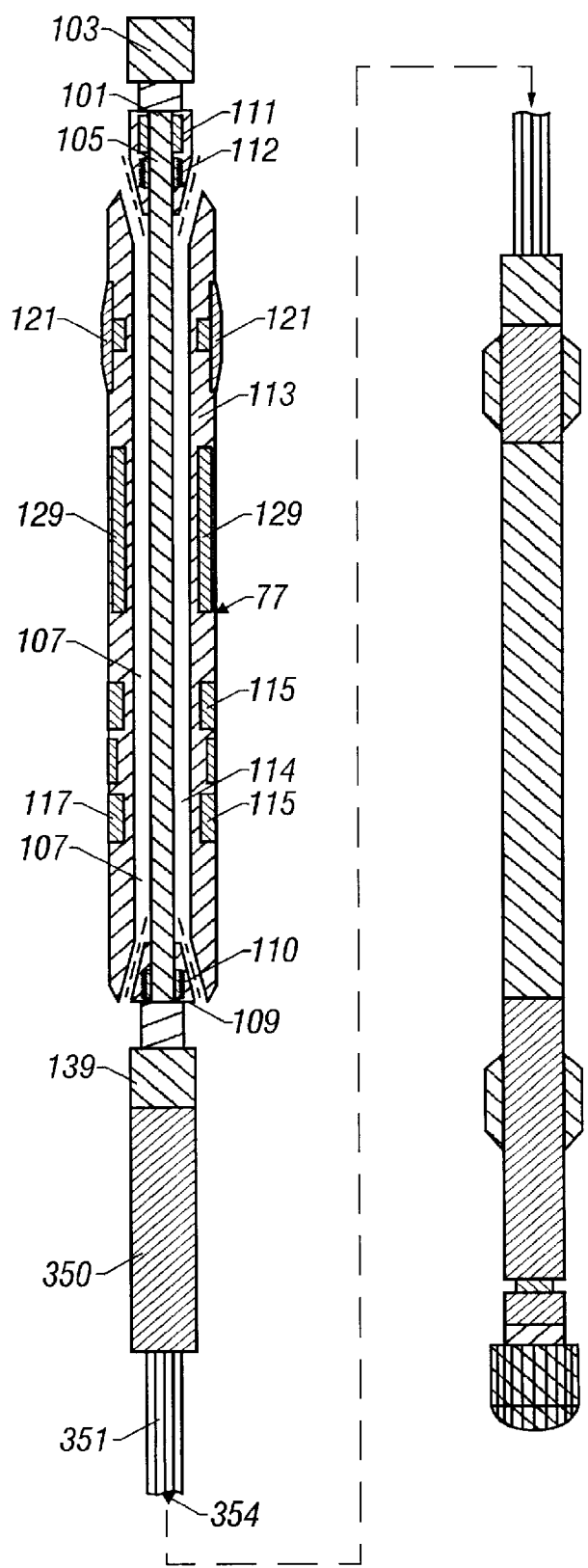
FIG. 4 shows the use of a thruster below the drill pipe section with the sensor assembly.

The device of Kruspe thus comprises a sensor assembly mounted on a slidable sleeve slidably coupled to a longitudinal member, such as a section of drill pipe. When the sensor assembly is held in a non rotating position, for instance for obtaining the measurements, the longitudinal member is free to rotate and continue drilling the borehole, wherein downhole measurements can be obtained with substantially no sensor movement or vibration. This is particularly useful in making NMR measurements due to their susceptibility to errors due caused by tool vibration. A clamping device is used, for instance, to hold the sensor assembly is held in the non rotating position. Also disclosed in Kruspe but not shown in FIG. 3 is the use of one or more thrusters for axial decoupling of the sensor assembly from the drillstring. FIG. 4 illustrates the use of a thruster 350 below the drill pipe section with the sensor assembly 113.

The specific NMR sensor discloses in Kruspe et al has permanent magnets as well as RF antennas on the sleeve. A suitable sensor configuration is disclosed in U.S. Pat. No. 6,215,304 to Slade, the contents of which are fully incorporated herein by reference. The tool is rotationally symmetric, i.e., it measures 360° around the tool simultaneously. However, as noted in the Kruspe patent, other magnet and antenna configurations could be used. An advantage of using the Slade device is that usually no borehole correction is necessary because the tool is tuned to read only formation signal unless the hole is severely enlarged or the tool is off center.

A thruster allows compensation for the axial drillstring movement during the acquisition. This is provides the tool with a great deal of flexibility in acquisition of NMR data. Specifically, four modes of operation are possible with the tool:

1. Measurement while the drillbit is actively engaged in making hole with the NMR sensor clamped to the formation;
2. Measurement while the drillbit is actively engaged in making hole with the NMR sensor rotating and moving downhole;
3. Measurement while connecting; and
4. Measurement while tripping.

For convenience, the first mode is referred to as the clamped mode, the second as the rotating mode, the third as the connecting mode and the fourth as the tripping mode. It should also be noted that there are other devices besides drillbits that could be used for "making hole", i.e., actively penetrating the formation. An example of this is the use of cutting jets that "make hole" by the use a fluid at high pressure injected through a nozzle. The term "making hole" as used hereafter is intended to cover the use of drillbits, cutting jets and other similar devices. The four modes of operation are now discussed briefly.

In the clamped mode of operation, the sensor assembly is clamped to the borehole and is thus substantially decoupled from motion of the drillbit and vibration of the bottom hole assembly. Depending upon the rate of penetration (ROP), data acquisition in the clamped mode may be carried out for several minutes. This makes it possible to acquire data with long pulse sequences with enhanced signal to noise ratio (SNR).

In the rotating mode, the sensor assembly is rotating at a rate that could be almost as rapid as the rotation of the drilling tubular. The rotation by itself does not degrade the quality of data acquired by the sensor assembly due to the complete rotational symmetry of the region of examination of the tool. However, due to tool vibration (transverse and vertical) and whirl, data quality may be degraded. This arises from the fact that the region of examination is relatively small so that pulse echo signals may arise from regions of the formation that are only partially polarized by the permanent magnets.

To deal with the problems caused by tool motion in the rotating mode, one embodiment of the present invention uses the teachings of co-pending U.S. patent application Ser. No. 09/778,205 of Hawkes et al, the contents of which are incorporated herein by reference. Hawkes et al teach the use of motion triggered pulsing for NMR measurements. The motion of the tool is measured by suitable motion sensors, such as accelerometers, magnetometers or gyroscopes or combinations thereof. These sensors may be placed at any suitable location on the drilling tool in the proximity of the magnet and coil arrangement. The wait period in a pulse sequence may be extended slightly without affecting the data quality and this feature may be used to delay the application of the tipping pulse until a suitable state of tool motion is achieved. The trigger may be obtained by monitoring the motion sensor signals. Suitable states for triggering are instantaneous moments when the tool is stationary, or if the motion has a strong periodic component, then subsequent pulse sequences may be triggered to synchronize with this motion. Such motion triggered pulsing will improve the NMR spin-echo formation. Hawkes also teaches the use of predictive filtering, such as Kalman filtering, for initiating the tipping pulse that is commonly used in a CPMG pulse sequence. This too may be used in the method of the present invention.

As would be recognized by those versed in the art, the length of the pulse sequences used in analysis of the formation would be controlled at least in part by the ROP. At low ROP, it is possible to use long pulse sequences to improve the SNR without loss of resolution. As always, the available power is a limitation and an optional embodiment of the present invention may use the modified CPMG sequence taught in U.S. Pat. No. 6,163,153 by Reiderman et al with a shortened refocusing pulse.

In the changing mode, the drillbit is non-rotating and the drillstring is clamped at the surface while additional sections of drill pipe are added or removed. However, due to the elasticity of the drillstring, vertical and transverse vibrations continue. The total acquisition time is usually limited to less than sixty seconds. Again, the motion triggered pulsing scheme of Hawkes et al may be used, and with better results than in the rotating mode. The improvement arises from the fact that the entire drillstring may be vibrating freely without additional stresses and whirl caused as the drillbit "makes hole."

In the tripping mode, the axial tool motion is quite rapid. Typically, three sections of drillstring (a total of 90 ft.) are pulled at a time, after which the drillstring is clamped at the surface (at which time acquisition in the changing mode is possible). Due to the rapid tool movement and the small aperture of the NMR tool, correction has to be made for the change in the sensitive volume during a pulse sequence. In one embodiment of the invention, this is a simple geometric correction factor based upon the nominal velocity of tool motion as measured at the surface. In an alternate embodiment of the invention, accelerometers on or near the NMR sensor make measurements of the axial acceleration of the NMR sensor. The actual velocity of tool motion is determined from the accelerometer measurements and used to derive the correction factor.

Regardless of the mode of operation, data are acquired and processed using one of two schemes. The standard data acquisition and processing scheme uses methods that have been used in wireline logging. The acquisition and processing parameters for this are stored in the memory of the downhole processor and are described below. In addition to the standard acquisition and processing scheme, the downhole processor also includes an expert system that analyzes data acquired by the NMR sensor assembly and one or more additional sensors, including formation sensors and sensors indicative of drilling conditions as discussed above. The expert system, as described below, modifies the acquisition and processing schemes used for the NMR data. This may be done independently of the surface processor 40 or may be done in response to downlink commands from the surface processor 40 through the communication sub 72. Such a downlink telemetry system is taught in European Patent 744,527 of Oppelt et al and U.S. Pat. No. 5,963,138 of Gruenhagen et al, having the same assignee as the present application.

Standard Acquisition and Processing

The acquisition and processing steps are discussed in conjunction. One pre-processing step that is routinely carried out is replacement of invalid data. Based on Quality Control (QC) diagnostics that indicate the tool performance, invalid data are recognized and (if possible) replaced by valid data. Recognition of invalid data is based on adequate diagnostics. These diagnostics are provided by the motion sensors discussed in the Hawkes application. Even in the clamped mode of acquisition, it is preferable to do the clamping at a time when the motion of the drill collar is small. While this is not a guarantee that good data will be acquired when clamped, it does provide some insurance. When data are acquired in the rotating mode, motion triggered pulsing is highly desirable. However, analysis of the data after acquisition may still require that all data of one acquisition cycle be discarded. For this purpose, diagnostics data have to be acquired and evaluated parallel to the NMR acquisition (e.g., hardware performance, vibration data). If these data are not available, the data quality can be indicated with real-time analysis of the sum of echos (SE) as discussed below.

If the motion sensors indicate that the entire cycle of measurements made in the clamped mode is defective due to excessive motion, then no correction of the data is possible. If, however, excessive motion occurs with a single echo train out of a plurality of echo trains made at a clamped position, then that echo train is replaced by a previously acquired echo train of the same phase and channel. The term "phase" here refers to phase alternated pulse sequences in the data acquisition as used in the art. The term "channel" refers to the fact that NMR echo signals are acquired in two channels that are in-phase and in quadrature to the RF carrier phase.

As another part of the preprocessing, if portions of echo trains are acquired when the diagnostics indicate excessive vibration, then these partial echo trains are replaced with null values. Subsequent processing recognizes these null values and accounts for them in the processing. Finally, if isolated points of the echo sequence are invalid, then these isolated points are replaced with a weighted or unweighted average of surrounding echo (point) data.

Another aspect of the present standard preprocessing in the present invention is that based on the echo shape and the overlying noise (white noise plus non-random ringing) several methods can be used for echo point averaging with different purposes. One simple method to average echo points is linear averaging of the data in the whole acquired echo window. An alternate embodiment of the invention uses weighted averaging of the data, where the weighting is fixed (e.g., cosine function) or determined in lab and field experiments (e.g., expected shape of the echo signal to maximize signal-to-noise ratio). These windows are centered on a peak value of the measured echo signal and provide some discrimination against random noise.

Another preprocessing step in the invention uses sums of individual echo trains as a quality control (QC) indicator. U.S. patent application Ser. No. 09/483,336 to Chen discusses the use of summed echo trains as a QC indicator and is incorporated herein by reference. In the present invention, sums of individual echo trains at a clamped depth are used to determine the quality of the data.

The standard preprocessing preferably includes the so-called phase alternated pulse (PAP) sequence. Successive CPMG or modified CPMG sequences are acquired with alternating phases of the tipping pulse. Depending on the sign convention used, the $-90°_x$ and $+90°_x$ data are either subtracted or added to eliminate constant offset of the echo channel data. If different echo train data are combined (also for phase and amplitude calculation and stacking), a corrected acquisition time for the combined data has to be calculated (e.g. for PAP data calculate mean acquisition time of the two echo trains) In an alternate embodiment of the invention, no PAP averaging is done. Such a method of data acquisition and processing is taught in co-pending U.S. patent application Ser. No. 09/691,514 of Chen, having the same assignee as the present application and the contents of which are fully incorporated herein by reference. As taught by Chen, phase alternation is done in the acquisition, but no averaging is done for pairs of phase alternated data; instead.

The preprocessing also includes a correction for stimulated echo effects. The stimulated echo effects arise from imperfect tipping and refocusing pulses. Evan a small gradient field makes it impossible to create a perfect pulse that will rotate protons in the sample space exactly the desired angle (e.g. 180°) and not rotate protons "near" the sample space that are off resonance. The calibration of the tool in a known environment allows these effects to be determined and correction equations derived. As a result of the imperfect pulses, the first few echoes do not fit the rest of the echoes and need to be scaled by a correction factor. It is commonly observed that amplitude of the first echo has to be increased, while the amplitude of later echos (such as the second and third echos) needs to be decreased by the stimulated echo correction. The correction for the first echo varies quadratically with $B_1$ and is computed from the current $B_1$ value. The correction for the second echo is independent of $B_1$. The correction equation is:

$$EPA_{n,corr} = STE_n * EPA_n \quad (1)$$

where $EPA_n$ and $EPA_{n,cor}$ are the uncorrected and corrected values of the n-th echo, and $STE_n$ is the stimulated echo correction. In a preferred embodiment of the invention, $STE_n$, is determined by lab or field experiments or by simulation results. As would be known to those versed in the art, $STE_n$ depends upon $B_1$ and the operating temperature. It may also depend upon the tipping and refocusing angles and the bandwidth of the transmitter and receiver.

Included in the standard preprocessing is a determination of the phase angle and noise level and correcting the measured amplitudes based on the phase angle. The signals measured in the two channels $E_x$ and $E_y$ have amplitudes $E_{xn}$ and $E_{yn}$ respectively. The phase angle θ is given by $$\theta = \tan^{-1}\left[\frac{\sum_{n=1}^{NE} E_{xn}}{\sum_{n=1}^{NE} E_{yn}}\right] \quad (2),$$

the echo amplitude $E_n$ is given by $$E_n = E_{yn} \cos\theta + E_{xn} \sin\theta \quad (3),$$

the noise $N_n$ is given by:

$$N_n = E_{xn} \cos\theta - E_{yn} \sin\theta \quad (4)$$

and the noise level $\sigma_N$ is given by:

$$\sigma = \sqrt{\frac{\sum_{n=1}^{NE} (N_n - mean(N))^2}{NE - 1}} \quad (5).$$

After the preprocessing steps are carried out, additional processing of the data is carried out for determination of petrophysical parameters of the formation. As part of the petrophysical processing, a calibration is carried out. A calibration factor is used to convert measured echo signals to signal amplitudes in porosity units (p.u.). Measurements are taken in an environment with known porosity and where a single decay component of the fluid is expected. The calibration procedure includes:
1. Measuring the temperature $Temp_{cal}$
2. Measuring echo data in a medium of known porosity $\phi_k$. In a preferred embodiment of the invention, this step comprises making measurements in a calibration chamber filled with 100% water ($\phi$=1.0).
3. Deriving a best linear fit to the logarithm of the echo data.
4. Extrapolating the linear fit back to zero time to give a value of the echo at zero time $E_0$.
5. Obtaining the calibration factor C as $$C = \phi_k / E_0. \quad (6)$$

The derived calibration factor C is applied to the acquired echo data.

Increasing salinity causes displacement of hydrogen atoms by salt ions. The salinity correction factor is multiplied to the echo data for compensation. The petrophysical processing of the echo data typically includes a correction for salinity. The salinity of the fluid in the tool's sensitive region can be approximated by the formation fluid salinity or, in case of an invaded formation, by the salinity of the mud filtrate. No salinity correction is necessary if the formation is mainly oil filled or if the resistivity of the formation fluid >10 Ωm at 75° F. The salinity correction SC is given by:

$$SC = NaCl/100,000 * 0.04 + 1 \quad (7)$$

NaCl=salinity of the fluid in the NMR-sensitive volume [in ppm]

Another step in the petrophysical processing is the derivation of the sum of echos SE. SE provides QC information used as discussed above in [0031]. SE also provides petrophysical information such as a high resolution permeability estimation. Such a method is disclosed in Sezinger et al., "High Resolution Permeability Indicator" presented at the 1999, SPWLA Annual Conferences and Exhibition, Oslo, Norway, June 1999.

Stacking of the data may be performed to increase SNR. In the clamped mode, this includes averaging of all data from one clamping cycle. In the connecting mode, this includes averaging of all data from one resting cycle. In the tripping mode, this includes windowed averaging of data over a plurality NL levels. Typically, in the tripping mode, data from up to 4 levels are averaged.

The downhole processor includes a program that determines the porosity of the formation and the irreducible water saturation (BVI). The acquired echo data are fitted by a multi-exponential decay plus an optional constant term:

$$E_n = \phi_0 + \sum_{i=1}^{K} \phi_i e^{-n\Delta/T_{2i}} \quad (8)$$

where n is the echo index and $\Delta$ is the interecho spacing. In a preferred embodiment of the invention, two exponential terms are used (K=2). In such a case, the total porosity $\phi$ is given by $$\phi = \sum_{i=0}^{k} \phi_i \quad (9)$$

The irreducible water saturation, BVI, is calculated by weighted contributions of the partial porosities in reference to a given cutoff value, $T_{2c}$. Porosity can also be measured by additional sensors (e.g. density, accoustic, neutron etc.) and can be compared with those measurements on a realtime basis.

Another step in the petrophysical processing is the correction for formation temperature. The formation temperature affects the thermal relaxation of the protons for $T_1$ and $T_2$ and reduces the amplitude of the returned signal with decreasing temperature. The magnitude of the amplitude correction expressed as the Formation Temperature Multiplier, FTM, is proportional to the absolute temperature.

$$FTM=(Temp_f+273.15)/(Temp_{ref}+273.15) \quad (10)$$

where $Temp_f$=Formation temperature in ° C.

and $Temp_{ref}$=Calibration reference temperature in ° C. This equation is based on Curie's Law.

The increased temperature of the formation reduces the density of the formation fluid and decreases the hydrogen index. Higher pressure increases the hydrogen index. The petrophysical processing includes a compensation for this change. The net difference is compensated for by the Hydrogen Depletion Multiplier, HDM, which is a function of the apparent porosity and formation temperature.

$$HDM=(\phi_a/30)*((Temp_f-10)/194.44)*0.1)+1 \quad (11)$$

where $\phi_a$=Apparent porosity from eq. (9), and $Temp_f$= Formation temperature in ° C.

In a preferred embodiment of the invention, when standard processing is used, the downhole processor sends processed data to the surface processor using the telemetry sub 72. Due to the limited transmission capability of the telemetry channel, the data that are sent up are limited. Typically, they include the total porosity $\phi$, the BVI, the sum of echos SE, and the level $\sigma_N$. Additional QC indicators that may be sent include the signals indicative of the motion of the tool. This is in addition to other formation evaluation data that may be sent uphole. These may include processed or unprocessed data from gamma ray tools, neutron logging tools, density tools and resistivity tools. Such devices would be known to those versed in the art and are not discussed here further.

The operator at the surface has access to the data sent from the telemetry sub 72 and they are processed and/or displayed by the surface control unit 40. Based upon this, the operator can evaluate the drilling conditions, make judgments about the lithology and formation fluid being drilled and evaluate the quality of the data (specifically including the NMR data). Based upon this evaluation, the operator may send instructions downhole that alter the acquisition parameters being used for the NMR data. This is done on a real-time basis in the drilling or clamping mode. It may also be done in the connecting mode and the tripping mode with less effectiveness. The reasons for the lowered effectiveness of altering the acquisition parameters is that in the tripping mode, the bottom hole assembly generally has a fairly rapid motion that may encompass several different lithologies and fluid types. The acquisition parameters that my be controlled are discussed next.

In a preferred embodiment of the invention, much of the NMR data are acquired using CPMG sequences or modified CPMG sequences as taught by Reiderman et al. As would be known to those versed in the art, a CPMG sequence may be represented as:

$$[TW_i-90_{\pm\pi/2}-(\tau-X-\tau-echo)_j]_i \quad (12)$$

where TW is a wait time, $90_{\pm\pi/2}$ refers to a phase alternated 90° tipping pulse, X is a refocusing pulse with a tipping angle that lies between 90° and 180°, j is the number of echos observed and $2\tau$ is an interecho spacing. The basic sequence within the square bracket may be repeated i times with different wait times and the whole sequence denoted by eq. (12) may be repeated at a single clamp position a plurality of times to improve the SNR. In the connecting and drilling modes, the number of repetitions is less than in the clamped mode. In the tripping mode, it is usually not possible to repeat the basic sequence due to the high rate of axial movement of the tool.

As noted above, data are preferably acquired using the phase alternation of the 90° tipping pulse. This is necessary to avoid baseline errors. Apart from this, the downhole processor has the capability of adjusting any of the parameters in the pulse sequence given by eq. (12). As noted above, in one embodiment of the invention, these changes are made by the operator at the surface using a downlink capability. The effects of changes in the parameters are discussed next.

The simplest parameter that may be controlled is the number of repetitions i in eq. (12). The primary use of this is to improve the SNR and make use of the stacking capability discussed above. The selection of this is determined primarily by the vibration of the tool and the accompanying degradation of the echo signals. In the clamped mode, this may be selected to be as large as necessary since there is no axial tool motion. In the connect mode, even though there is no axial movement of the drillstring at the surface, due to the elasticity of the drillstring, there may be axial movement of the NMR sensor assembly at depth. Obviously, in the tripping mode, the number of repetitions can be increased only at the cost of loss of resolution. In the drilling mode, the loss of resolution with a large choice of i depends upon the rate of penetration ROP: in hard limestones and dolomite rocks, the ROP is small and hence more repetitions can be done, while in soft shales and soft sandstones, the number of repetitions would be less.

Along with i, the wait time TW can also be changed. The effect of changing the wait time is to change the amount of polarization of the nuclear spins between successive CPMG sequences produced by the static magnetic field. In reservoirs including gas or light oil, long wait times are required to fully polarize the hydrogen nuclei. This would appear to make it necessary to acquire data with long wait times to provide an estimate of gas saturation. In the clamped mode, wait times of several seconds are possible. However, estimates of gas saturation may also be obtained using shorter wait times. This is discussed in copending U.S. patent application Ser. No. 09/396,286 of Thern et al, the contents of which are fully incorporated herein by reference. Thern teaches the use of a dual wait time data wherein the formation water is substantially fully polarized at both wait times while the gas component experiences a different partial saturation for the two wait times. The method of Thern may be used at normal logging speeds and is hence also suitable for measurements in the drilling mode and in the connect mode. It may also be used with less effectiveness in the tripping mode.

At the other end of the relaxation time distribution, clay bound water has an extremely short relaxation time. There are a number of different approaches that may be taken to address this problem In on embodiment of the invention, a first plurality of short pulse sequences (small values of j) are acquired followed by a second plurality of longer pulse sequences (larger values of j) wherein the second plurality i is less than the first plurality i. This makes it possible to improve the SNR for the early portion of the decay spectrum that needs it the most. Alternatively, a series of short pulse sequences are acquired with a small value of $\tau$ followed by one or more regular (long) pulse sequences with a longer value of $\tau$. The short pulse sequences with the small value of $\tau$ make it possible to determine the CBW of the formation while the long pulse sequence is used for obtaining the slowly relaxing components. In an alternate embodiment of the invention, data are acquired with a variable $\tau$ within a single sequence as taught in an application entitled "NMR Data Acquisition with Multiple Interecho Spacing" filed under Attorney Docket No. 414-26580 on Jun. 28, 2001, the contents of which are fully incorporated herein be reference.

Another acquisition parameter that can be controlled is the length and shape of the refocusing pulse. The Reiderman patent discusses the advantage of shortening the tipping angle of the refocusing pulse for conserving power. In an alternate embodiment of the present invention, the shape of the refocusing pulse may also be changed. Co-pending U.S. patent application Ser. No. 09/606,998 of Beard et al, having the same assignee as the present application and the contents of which are fully incorporated herein by reference, discusses the effect of pulse shaping in a multi-frequency NMR tool for reducing the interference between pulse sequences at different RF frequencies. As discussed by Beard et al, the excitation and refocusing pulses need not be square waves in the time domain. In the context of the present invention, the teachings of Beard et al are also applicable in that the even for a single frequency tool, it is desirable to match the bandwidth of the 90° pulse with the bandwidth of the refocusing pulses.

Expert System for Control of Acquisition Parameters

Another novel feature of the present invention is the implementation of an Expert System in the downhole processor for control of the acquisition parameters. There are three types of input data to the expert system. First, the Expert System adjusts the acquisition parameters from the NMR data alone. In the simplest example the Expert System may compare the QC indicators, such as the sum of echos at different levels. If outliers are detected, a warning signal is sent uphole.

The Expert System analyzes the acquired NMR data and from this, the pulse sequences may be shortened or lengthened (both i and j in eq. (12)) and the $\tau$ and TW may be adjusted as discussed above. This may be based upon the determined porosity and $T_2$ spectrum characteristics such as BVI, BVM (bound water movable), the geometric mean of the $T_2$ distribution, the main peaks of the $T_2$ distribution.

The Expert System also has access to measurements made by other sensors described above with reference to FIG. 2. These may relate to drilling conditions or to the formation properties. An example of sensors relating to drilling conditions, i.e., the accelerometer measurements, has already been discussed above with respect to motion triggered pulsing. If the downhole conditions are changing, the acquisition and processing parameters are changed accordingly.

In order to benefit from information relating to formation properties, it is preferable that the other formation evaluation sensors be located between the NMR sensors and the drillbit. With this configuration, measurements made by the other formation evaluation sensors are analyzed downhole and, based upon the rate of penetration, the Expert System knows the properties of the formation being drilled. The FPT gives an estimate of fluid mobility (defined as the ratio of permeability to viscosity). This, when combined with the NMR-determined permeability gives the fluid viscosity. FPT is also evaluating the fluid type—an information which can be used for NMR MWD again If the preferred arrangement (other formation evaluation sensors located between the NMR sensors and the drill bit) is not used, then the Expert System changes the NMR acquisition parameters based upon predicted stratigraphy.

Specifically, gamma rays measurements may be used to determine the shale content of the formation at the depth of the NMR sensors. In a shaly interval, short pulse sequences and small values of $\tau$ are sufficient. The presence of hydrocarbons in the formation is diagnosed from resistivity measurements. The presence of gas in the formation may be indicated by acoustic log measurements. As would be known to those versed in the art, even a small amount of gas in the formation significantly lowers the P-wave velocity in a porous sand formation and additional changes in P-wave velocity changes are only slightly affected by the amount of gas present. In such a situation, it is desirable to use a dual wait time acquisition and processing to determine the gas saturation.

Any changes made by the Expert System in the acquisition and processing parameters are communicated uphole. The operator may then review these changes and, if necessary, override the decisions made by the Expert System.

The Expert System is preferably implemented using neural networks (NNs). In a preferred embodiment of the invention, more than one NN is used. A first NN is used for determination of lithology and formation fluid type from formation property measurements. A second NN is used for modifying the NMR acquisition and processing parameters based upon the knowledge of the lithology and fluid type and the drilling conditions. These are discussed separately.

The first NN that is used for lithology and fluid determination has as its input measurements from formation evaluation sensors. As noted above, these can include resisitivity, acoustic, gamma ray, density and neutron sensors. Based upon these sensor outputs, the lithology and fluid content of the formation can be determined by a human. A NN implementation of the lithology/fluid identification involves changing the parameters of the NN to provide a match with the evaluation made by a human expert.

The second NN that is used in the present invention has its inputs the lithology/fluid content of the formation and the output of drilling condition sensors. These inputs are used to modify the NMR acquisition parameters. Once again, the objective is to determine the parameters of this second NN that match those of a human expert.

As would be known to those versed in the art, there are three main steps involved in using a NN. The first step is the training of the NN. Required for this is a wide statistical sampling of input parameters and the corresponding decision of a human expert. The second step is the validation of the NN; in the validation process, samples that are different from those used in the training process are input to the NN and the decision of the NN is again compared with that of the human expert. If there is agreement, then the NN has been validated. Once the NN has been validated, its structure and parameters may be stored in the processor and NN may then be used to process, preferably in real time, measurements made by the logging device. In a preferred embodiment of the invention, the Stuttgart Neural Net Simulator is used for the training of the NN.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for drilling a borehole and determining a parameter of interest of a formation surrounding the borehole, said apparatus comprising:
    (a) a longitudinal member for rotating a drill bit and adapted to be conveyed in the borehole;
    (b) a nuclear magnetic resonance (NMR) sensor assembly including at least one member slidably coupled to and spaced apart from said longitudinal member defining a flow path for drilling fluid therebetween, said NMR sensor assembly producing a pulsed RF field for obtaining measurements indicative of the parameter of interest of the formation, said RF field characterized by a plurality of parameters; and
    (c) a downhole processor for varying at least one parameter of the pulsed RF field.

2. The apparatus of claim 1 wherein the pulsed RF field comprises a pulse sequence of the form:

$$[TW_i-90_{\pm\pi/2}-(\tau-X-\tau-echo)_j]_i$$

wherein TW is a wait time, $90_{\pm\pi/2}$ refers to a phase alternated 90° tipping pulse, X is a refocusing pulse with a tipping angle that lies between 90° and 180°, j is the number of echos observed, i is a number of repetitions, and $2\tau$ is an interecho spacing, and wherein the parameter of interest of the pulsed RF field is selected from the group consisting of: (i) the tipping angle of the refocusing pulse, (ii) the number of echos j, (iii) the number of repetitions i, (iv) the interecho spacing, and (v) the wait time.

3. The apparatus of claim 1 wherein the sensor assembly further comprises:
    at least one clamping device for engaging the borehole to clamp the sensor assembly to the borehole.

4. The apparatus of claim 1 wherein the longitudinal member is a segment of drill pipe.

5. The apparatus of claim 1 wherein the longitudinal member is a shaft on a downhole directional drilling assembly.

6. The apparatus of claim 1 further comprising:
    at least one thruster connected to the sensor assembly for providing axial decoupling of the at least one member of the sensor assembly from the longitudinal member and for dampening vibrations to the at least one member.

7. The apparatus of claim 1 wherein the NMR sensor assembly is operated in one of (i) a clamped mode, (ii) a rotating mode, (iii) in a changing mode, and, (iv) a tripping mode.

8. The apparatus of claim 1 further comprising a drilling sensor module for making measurements relating to a drilling parameter selected from the group consisting of (i) a bit bounce, (ii) stick-slip of the longitudinal member, (iii) backward rotation, (iv) torque, (v) shocks, (vi) borehole and annulus pressure, and (vii) acceleration.

9. The apparatus of claim 1 further comprising a formation evaluation sensor for making measurements indicative of at least one of (i) a lithology of the formation, (ii) a fluid content of the formation, and, (iii) a petrophysical property of the formation.

10. The apparatus of claim 1 further comprising a telemetry module for communicating signals to and from a surface location.

11. The apparatus of claim 1 wherein the processor provides a quality control (QC) diagnostic based on at least one of (i) a signal from a motion sensor, (iii) a sum of echos (SE) produced by the NMR sensor assembly.

12. The apparatus of claim 11 wherein the processor uses said QC diagnostic for at least one of (i) discarding a subset of said measurements, (ii) replacing a subset of said measurements with another subset of said measurements, (iii) zeroing out partial echo trains.

13. The apparatus of claim 1 wherein the processor performs an averaging of measurements within a time window.

14. The apparatus of claim 13 wherein the averaging is one of (i) an unweighted averaging, and, (ii) a weighted averaging.

15. The apparatus of claim 1 wherein the processor combines data with different phases of the tipping pulse for reducing an error in the measurements.

16. The apparatus of claim 1 wherein the processor applies a stimulated echo correction to said measurements.

17. The apparatus of claim 16 wherein said stimulated echo correction is determined by at least one of (i) a temperature of the formation, (ii) an intensity of the RF field, (iii) a bandwidth of the tipping pulse, and, (iv) a bandwidth of the refocusing pulse.

18. The apparatus of claim 1 wherein said measurements further comprise two channels of data, the processor further determining a corrected measurement based on measurements on said two channels and a phase angle therebetween.

19. The apparatus of claim 1 wherein the processor applies a calibration to said measurements, said calibration based upon measurements made with the NMR sensor assembly in a medium of known porosity.

20. The apparatus of claim 19 wherein said calibration is dependent upon a temperature of the medium.

21. The apparatus of claim 1 wherein the processor applies a correction for salinity of a fluid in the formation.

22. The apparatus of claim 2 wherein the processor stacks data acquired in a plurality of repetitions.

23. The apparatus of claim 1 wherein the processor applies a multiexponential fit to said measurements.

24. The apparatus of claim 1 wherein the processor applies a correction based upon a temperature of the formation to said measurements.

25. The apparatus of claim 9 wherein the processor further comprises an expert system for determining from said measurements of the formation evaluation sensor at least one of (i) the lithology of the formation, (ii) the fluid content of the formation, and (iii) a petrophysical property of the formation.

26. The apparatus of claim 25 wherein the processor varies the at least one parameter of the pulsed RF field at least partially in response to the at least one of (A) the determined lithology of the formation, and, (B) the determined fluid content of the formation.

27. The apparatus of claim 26 wherein the pulsed RF field comprises a pulse sequence of the form:

$$[TW_i\text{-}90_{\pm\pi/2}\text{-}(\tau\text{-}X\text{-}\tau\text{-}echo)_j]_i$$

wherein TW is a wait time, $90_{\pm\pi/2}$ refers to a phase alternated 90° tipping pulse, X is a refocusing pulse with a tipping angle that lies between 90° and 180°, j is the number of echos observed, i is a number of repetitions, and 2τ is an interecho spacing, and wherein the parameter of interest of the pulsed RF field is selected from the group consisting of: (I) the tipping angle of the refocusing pulse, (II) the number of echos j, (III) the number of repetitions i, (IV) the interecho spacing, and, (V) the wait time.

28. The apparatus of claim 1 wherein the NMR sensor assembly is operated in a clamped mode and the processor varies the at least one parameter in response to a rate of penetration (ROP) of the drillbit.

29. The apparatus of claim 1 wherein the NMR sensor assembly is operated in one of (i) a rotating mode, (ii) a changing mode, and, (iii) a tripping mode, and the processor varies the at least one parameter in response to a signal from a motion sensor on the apparatus.

30. The apparatus of claim 29 wherein the NMR sensor assembly is operated in a tripping mode and the processor further applies a correction to said measurements based upon a signal from a motion sensor on the apparatus.

31. The apparatus of claim 29 wherein the processor processes said measurements in one of (i) based upon a signal from a surface processor, and, (ii) independently of the surface processor.

32. The apparatus of claim 1 wherein the processor performs at least one of (i) deleting a subset of said measurements, (ii) replacing a subset of said measurements, and, (iii) zeroing a subset of echos in an echo train.

33. The apparatus of claim 1 wherein the processor determines a calibration factor relating said measurements to a porosity of the formation, said calibration factor being related to a temperature of the formation.

34. The apparatus of claim 1 wherein the processor determines from said measurements the parameter of interest, said parameter of interest being at least one of (i) a total porosity, (ii) an effective porosity, (iii) a volume fraction of clay bound water, and, (iii) and a volume fraction of bound water irreducible, and (iv) movable water.

35. An apparatus for drilling a borehole and determining a parameter of interest of a formation surrounding the borehole, said apparatus comprising:
(a) a longitudinal member for rotating a drill bit and adapted to be conveyed in the borehole;
(b) a nuclear magnetic resonance (NMR) sensor assembly producing a pulsed RF field for obtaining measurements indicative of the parameter of interest of the formation, said RF field characterized by a plurality of parameters; and
(c) a downhole processor including an expert system for controlling at least one parameter of the pulsed RF field.

36. The apparatus of claim 35 wherein the pulsed RF field comprises a pulse sequence of the form:

$$[TW_i\text{-}90_{\pm\pi/2}\text{-}(\tau\text{-}X\text{-}\tau\text{-}echo)_j]_i$$

wherein TW is a wait time, $90_{\pm\pi/2}$ refers to a phase alternated 90° tipping pulse, X is a refocusing pulse with a tipping angle that lies between 90° and 180°, j is the number of echos observed, i is a number of repetitions, and 2τ is an interecho spacing, and wherein the parameter of interest of the pulsed RF field is selected from the group consisting of: (i) the tipping angle of the refocusing pulse, (ii) the number of echos j, (iii) the number of repetitions i, (iv) the interecho spacing, and (v) the wait time.

37. The apparatus of claim 35 wherein the NMR sensor assembly further comprises:
(i) a member slidably coupled to and spaced apart from said longitudinal member defining a flow path for drilling fluid therebetween; and
(ii) at least one clamping device for engaging the borehole to clamp said member to the borehole.

38. The apparatus of claim 35 wherein the longitudinal member selected from the group consisting of (i) a segment of drill pipe, and, (ii) a shaft on a downhole directional drilling assembly.

39. The apparatus of claim 35 further comprising a telemetry module for communicating signals to and from a surface location.

40. The apparatus of claim 36 wherein the processor applies a stimulated echo correction to said measurements, said stimulated echo correction determined by at least one of (i) a temperature of the formation, (ii) an intensity of the RF field, (iii) a bandwidth of the tipping pulse, and, (iv) a bandwidth of the refocusing pulse.

41. The apparatus of claim 35 further comprising a formation evaluation sensor for making measurements indicative of at least one of (i) a lithology of the formation, and, (ii) a fluid content of the formation.

42. The apparatus of claim 41 wherein the expert system determines from said measurements of the formation evaluation sensor at least one of (i) the lithology of the formation, (ii) the fluid content of the formation, and (iii) petrophysical properties.

43. A method of using a bottom hole assembly (BHA) conveyed in a borehole of an earth formation for determining a parameter of interest of the formation comprising:
(a) using a longitudinal member on the BHA for penetrating the formation;
(b) using a nuclear magnetic resonance (NMR) sensor assembly on the BHA for producing a pulsed RF field for obtaining measurements indicative of the parameter of interest of the formation, said RF field characterized by a plurality of parameters, said NMR assembly including at least one member slidably coupled to and spaced apart from said longitudinal member defining a flow path for drilling fluid therebetween; and
(c) using a downhole processor on the BHA for varying at least one parameter of the pulsed RF field.

44. The method of claim 43 wherein producing the pulsed RF field comprises pulsing a transmitter on the sensor assembly with a pulse sequence of the form:

$[TW_i-90_{\pm\pi/2}-(\tau-X-\tau-\text{echo})_j]_i$ wherein TW is a wait time, $90_{\pm\pi/2}$ refers to a phase alternated 90° tipping pulse, X is a refocusing pulse with a tipping angle that lies between 90° and 180°, j is the number of echos observed, i is a number of repetitions, and 2τ is an interecho spacing, and wherein the parameter of interest of the pulsed RF field is selected from the group consisting of: (i) the tipping angle of the refocusing pulse, (ii) the number of echos j, (iii) the number of repetitions i, (iv) the interecho spacing, and (v) the wait time.

45. The method of claim 43 further comprising using at least one clamping device for engaging the borehole to clamp the at least one member to the borehole.

46. The method of claim 43 further comprising using at least one thruster connected to the sensor assembly for providing axial decoupling of the at least one member of the sensor assembly from the longitudinal member and for dampening vibrations to the at least one member.

47. The method of claim 43 further comprising using a drilling sensor module for making measurements relating to a drilling parameter selected from the group consisting of (i) a bit bounce, (ii) stick-slip of the longitudinal member, (iii) backward rotation, (iv) torque, (v) shocks, (vi) borehole and annulus pressure, and (vii) acceleration.

48. The method of claim 43 further comprising using a formation evaluation sensor for making measurements indicative of at least one of (i) a lithology of the formation, and, (ii) a fluid content of the formation.

49. The method of claim 43 further comprising using a telemetry module on the BHA for communicating signals to and from a surface location.

50. The method of claim 43 further comprising using the processor for providing a quality control (QC) diagnostic based on at least one of (i) a signal from a motion sensor, (iii) a sum of echos (SE) produced by the NMR sensor assembly.

51. The method of claim 50 further comprising using the processor, based on said QC diagnostic, for at least one of (i) discarding a subset of said measurements, (ii) replacing a subset of said measurements with another subset of said measurements, (iii) zeroing out partial echo trains.

52. The method of claim 43 further comprising using the processor for combining measurements with different phases of the tipping pulse for reducing an error therein.

53. The method of claim 43 further comprising using the processor for applying a stimulated echo correction to said measurements.

54. The method of claim 43 wherein said measurements further comprise two channels of data, the method further comprising using the processor for determining a corrected measurement based on measurements on said two channels and a phase angle therebetween.

55. The method of claim 43 further comprising using the processor for calibrating said measurements, said calibration based upon measurements made with the NMR sensor assembly in a medium of known porosity.

56. The method of claim 43 further comprising using the processor for applying a multiexponential fit to said measurements.

57. The method of claim 49 further comprising sending a control signal from the surface location to the processor and varying the at least one parameter of the pulsed RF field in response thereto.

58. The method of claim 48 wherein the processor further comprises an expert system for determining from said measurements of the formation evaluation sensor at least one of (i) the lithology of the formation, and, (ii) the fluid content of the formation.

59. The method of claim 58 wherein the expert system varies the at least one parameter of the pulsed RF field at least partially in response to one (i) the lithology of the formation, and, (ii) the fluid content of the formation.

60. The method of claim 43 further comprising:
   (i) operating the NMR sensor assembly in a clamped mode,
   (ii) determining a rate of penetration of the longitudinal member, and
   (iii) varying the at least one parameter of the RF field in response to said rate of penetration (ROP) of the drillbit.

61. The method of claim 43 further comprising using the processor for determining from said measurements the parameter of interest, said parameter of interest being at least one of (i) a total porosity, (ii) an effective porosity, (iii) a volume fraction of clay bound water, and, (iii) and a volume fraction of bound water irreducible.

62. A method of using a bottom hole assembly (BHA) conveyed in a borehole of an earth formation for determining a parameter of interest of the formation comprising:
   (a) using a longitudinal member on the BHA for penetrating the formation;
   (b) using a nuclear magnetic resonance (NMR) sensor assembly on the BHA for producing a pulsed RF field for obtaining measurements indicative of the parameter of interest of the formation, said RF field characterized by a plurality of parameters; and
   (c) using a downhole processor including an expert system for determining a lithology of the formation and selecting at least one parameter of the pulsed RF field based at least in part on the determined lithology.

63. The method of claim 62 wherein producing the pulsed RF field comprises pulsing a transmitter on the sensor assembly with a pulse sequence of the form:

$[TW_i-90_{\pm\pi/2}-(\tau-X-\tau-\text{echo})_j]_i$ wherein TW is a wait time, $90_{\pm\pi/2}$ refers to a phase alternated 90° tipping pulse, X is a refocusing pulse with a tipping angle that lies between 90° and 180°, j is the number of echos observed, i is a number of repetitions, and 2τ is an interecho spacing, and wherein the parameter of interest of the pulsed RF field is selected from the group consisting of: (i) the tipping angle of the refocusing pulse, (ii) the number of echos j, (iii) the number of repetitions i, (iv) the interecho spacing, and (v) the wait time.

64. The method of claim 62 further comprises:
   (i) using a member on the NMR assembly slidably coupled to and spaced apart from said longitudinal member defining a flow path for drilling fluid therebetween; and
   (ii) using at least one clamping device for engaging the borehole to clamp said member to the borehole.

65. The method of claim 62 wherein the longitudinal member is selected from the group consisting of (i) a segment of drill pipe, and, (ii) a shaft on a downhole directional drilling assembly.

66. The method of claim 62 further comprising using a telemetry module on the BHA for communicating signals to and from a surface location.

67. The method of claim 63 further comprising using the processor for applying a stimulated echo correction to said measurements, said stimulated echo correction determined by at least one of (i) a temperature of the formation, (ii) an intensity of the RF field, (iii) a bandwidth of the tipping pulse, and, (iv) a bandwidth of the refocusing pulse.

68. The apparatus of claim 62 further comprising using a formation evaluation sensor for making measurements indicative of at least one of (i) a lithology of the formation, and, (ii) a fluid content of the formation.

69. The apparatus of claim 68 further comprising using the expert system for determining from said measurements of the formation evaluation sensor at least one of (i) the lithology of the formation, (ii) the fluid content of the formation, and (iii) petrophysical properties of the formation.

70. The apparatus of claim 35 further comprising a formation pressure tester (FPT) wherein said downhole processor determines a fluid viscosity from measurements made by the FPT and NMR sensor assembly.

71. The apparatus of claim 70 wherein said FPT is positioned between said NMR sensor assembly and a drill bit.

72. The apparatus of claim 35 wherein said downhole processor determines a parameter of interest of said formation.

73. The apparatus of claim 72 wherein said parameter of interest comprises at least one of (i) clay bound water, (ii) gas saturation, (iii) porosity, (iv) bound volume irreducible, (v) bound water movable, (vi) shale content, and (vii) presence of hydrocarbons.

74. The apparatus of claim 35 further comprising an additional sensor selected from the group consisting of (i) a gamma ray sensor, (ii) a neutron sensor, (iii) a resistivity sensor, and, (iv) an acoustic sensor.

75. The apparatus of claim 74 wherein said additional sensor is positioned between said NMR sensor assembly and a drillbit.

76. The apparatus of claim 35 further comprising a drilling sensor module for making measurements relating to a drilling parameter selected from the group consisting of (i) a bit bounce, (ii) stick-slip of the longitudinal member, (iii) backward rotation, (iv) torque, (v) shocks, (vi) borehole and annulus pressure, and (vii) acceleration.

77. The apparatus of claim 35 wherein the processor provides a quality control (QC) diagnostic based on at least one of (i) a signal from a motion sensor, (iii) a sum of echos (SE) produced by the NMR sensor assembly.

78. The apparatus of claim 35 wherein said measurements further comprise two channels of data, the processor further determining a corrected measurement based on measurements on said two channels and a phase angle therebetween.

79. The apparatus of claim 35 wherein the processor applies a calibration to said measurements, said calibration based upon measurements made with the NMR sensor assembly in a medium of known porosity.

80. The apparatus of claim 76 wherein the processor alters said at least one parameter of the RF field based on an output of said drilling sensor module.

81. The apparatus of claim 35 wherein said expert system comprises a neural net that has been trained and validated.

82. The method of claim 62 further comprising:
(i) using a formation pressure tester (FPT) for providing a measurement indicative of a mobility of a fluid in said formation, and
(ii) using said downhole processor for determining a fluid viscosity from measurements made by the FPT and NMR sensor assembly.

83. The method of claim 82 further comprising positioning FPT between said NMR sensor assembly and a drill bit.

84. The method of claim 62 further comprising using said downhole processor for determining a parameter of interest of said formation.

85. The method of claim 62 wherein said parameter of interest comprises at least one of (i) clay bound water, (ii) gas saturation, (iii) porosity, (iv) bound volume irreducible, (v) bound water movable, (vi) shale content, and (vii) presence of hydrocarbons.

86. The method of claim 62 further comprising using an additional sensor selected from the group consisting of (i) a gamma ray sensor, (ii) a neutron sensor, (iii) a resistivity sensor, and, (iv) an acoustic sensor, for making a measurement indicative of a parameter of interest of said formation.

87. The method of claim 86 wherein said additional sensor is positioned between said NMR sensor assembly and a drillbit.

88. The method of claim 86 further comprising using the expert system for determining from said measurements of the formation evaluation sensor at least one of (A) the lithology of the formation, and, (ii) the fluid content of the formation.

89. The method of claim 62 further comprising using a drilling sensor module for making measurements relating to a drilling parameter selected from the group consisting of (i) a bit bounce, (ii) stick-slip of the longitudinal member, (iii) backward rotation, (iv) torque, (v) shocks, (vi) borehole and annulus pressure, and (vii) acceleration.

90. The method of claim 89 further comprising using said expert system for altering said at least one parameter of the RF field in response to an output of said drilling sensor module.

91. The method of claim 62 further comprising using the processor for providing a quality control (QC) diagnostic based on at least one of (i) a signal from a motion sensor, (iii) a sum of echos (SE) produced by the NMR sensor assembly.

92. The method of claim 91 further comprising using the processor based on said QC diagnostic for at least one of (i) discarding a subset of said measurements, (ii) replacing a subset of said measurements with another subset of said measurements, (iii) zeroing out partial echo trains.

93. The method of claim 62 further comprising using said processor for combining data with different phases of the tipping pulse for reducing an error in the measurements.

94. The method of claim 62 further comprising using said processor for applying a stimulated echo correction to said measurements.

95. The method of claim 94 wherein said stimulated echo correction is determined by at least one of (i) a temperature of the formation, (ii) an intensity of the RF field, (iii) a bandwidth of the tipping pulse, and, (iv) a bandwidth of the refocusing pulse.

96. The method of claim 62 wherein said measurements further comprise two channels of data, the method further comprising using said processor for determining a corrected measurement based on measurements on said two channels and a phase angle therebetween.

97. The method of claim 62 wherein the processor applies a calibration to said measurements, said calibration based upon measurements made with the NMR sensor assembly in a medium of known porosity.

98. The method of claim 62 wherein the processor applies a correction for salinity of a fluid in the formation.

* * * * *